United States Patent [19]

Janson, Jr.

[11] Patent Number: 5,382,167
[45] Date of Patent: Jan. 17, 1995

[54] MAGNETICALLY SECURED TEMPORARY ELECTRICAL CONNECTOR

[75] Inventor: Wilbert F. Janson, Jr., Shortsville, N.Y.

[73] Assignee: Eastman Kodak Company, Rochester, N.Y.

[21] Appl. No.: 161,638

[22] Filed: Dec. 3, 1993

[51] Int. Cl.⁶ .......................................... H01R 11/30
[52] U.S. Cl. ........................................ 439/38; 439/929
[58] Field of Search ....................... 439/38, 929; 320/2

[56] References Cited

U.S. PATENT DOCUMENTS

| | | | |
|---|---|---|---|
| 2,234,982 | 3/1941 | Ross | 439/38 X |
| 3,277,358 | 10/1966 | Nicholl | 439/38 X |
| 3,492,037 | 1/1970 | Hutchinson | 292/251.5 |
| 3,786,391 | 1/1974 | Mathauser | 339/12 R |
| 4,227,726 | 10/1980 | Sorimachi | 292/251.5 |
| 4,270,781 | 6/1981 | Nishimura | 292/251.5 |
| 4,331,355 | 5/1982 | Okuno | 292/251.5 |
| 4,702,506 | 10/1987 | Iimura | 292/251.5 |
| 4,719,334 | 1/1988 | Rebel | 439/38 X |

FOREIGN PATENT DOCUMENTS 2576459  7/1986  France .................................. 439/38

*Primary Examiner*—Eugene F. Desmond
*Attorney, Agent, or Firm*—Roger A. Fields

[57] ABSTRACT

A magnetically retained, electrical connection system for making secure, temporary electrical contact between a first coupling surface of a portable appliance, e.g. a rechargeable battery powered photographic camera, and a second coupling surface of a base or recharging unit for passing electrical signals therebetween when the coupling surfaces are brought into contact. The connection system comprises electrical contacts positioned in relation to magnetic circuit closing latch components on the coupling surfaces of the portable appliance and base unit adapted to close electrical and magnetic circuits when contacted under pressure. The latch is latched in response to a first push movement of the coupling surfaces toward one another, thereby closing the electrical and magnetic circuits, and unlatched to break the electrical and magnetic circuits when the appliance, positioned with respect to the second unit, is subjected to a second push movement of the coupling surfaces toward one another.

21 Claims, 3 Drawing Sheets

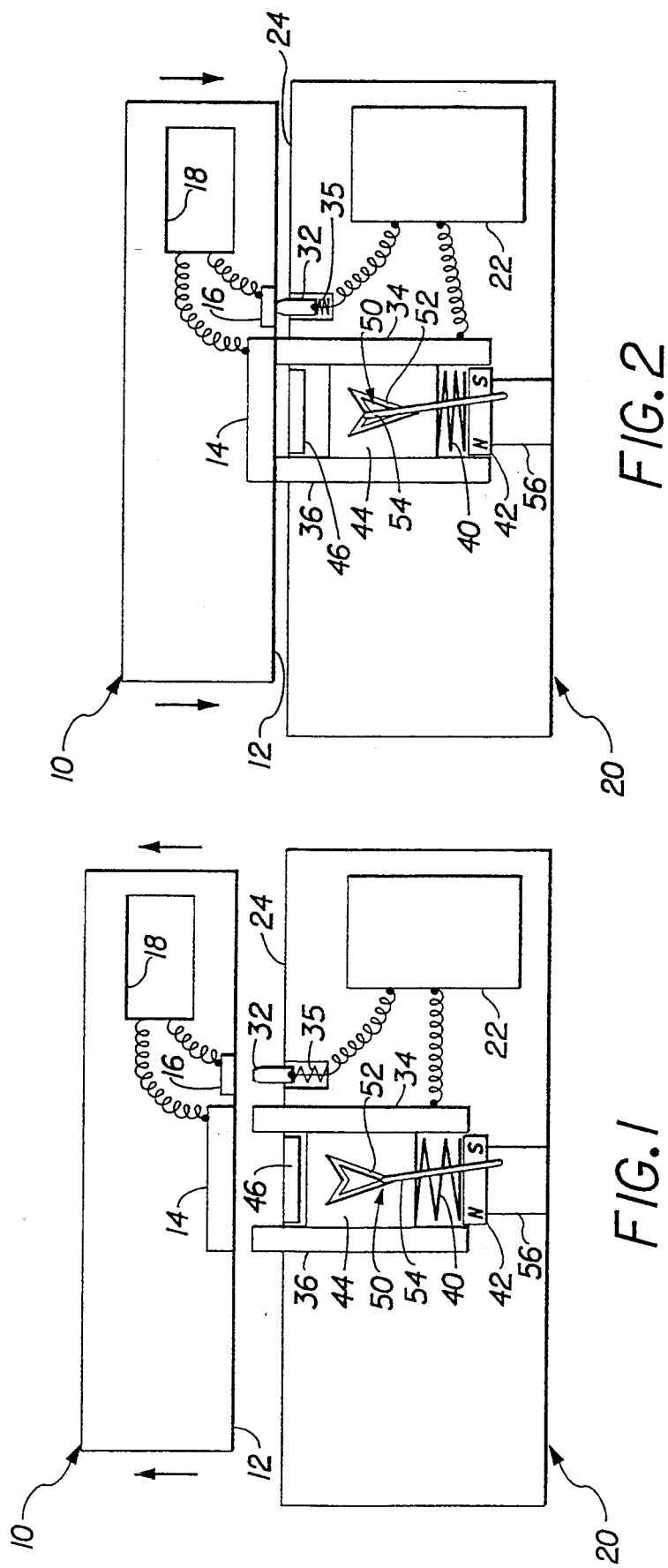

MAGNETICALLY SECURED TEMPORARY ELECTRICAL CONNECTOR

FIELD OF THE INVENTION

The present invention relates to temporary electrical connectors and more particularly to a low voltage and current connector employing a magnetically secured latch actuated manually between latched and unlatched positions by successive push movements for providing recharging current from a power unit to a rechargeable battery of an appliance, e.g. a photographic still camera.

BACKGROUND OF THE INVENTION

Temporary electrical connectors for effecting a secure mechanical and electrical interconnection between a base unit and a portable electrical unit or appliance for providing electrical signals therebetween are well known. Electrical connectors for directly powering portable appliances or for recharging of batteries contained in the appliance employ a wide variety of connector systems in the prior art. For example, the appliance may be fitted with a socket or pin array for connection with a matching pin or socket array mounted in a cradle on the surface of or on a cable extending from a line powered, AC/DC voltage converter and charger base unit. In some systems, rechargeable batteries or battery packs may be pressed into mating receptacles of the portable unit during use and the base unit during recharging so that electrical contact is made by the battery terminals with spring contacts in the receptacles.

As long as the size of the appliance allows, receptacles and/or connectors of any size may be employed. In the simplest systems, the weight and shape of the portable appliance may be relied on to make secure electrical contact between simple surface contacts when the shaped appliance coupling surface is mated to the base unit coupling surface.

However, battery powered portable appliances, e.g. still photographic cameras, calculators, computers, telephones, dictation and music tape or solid state recorders, hand tools, etc., have progressively become smaller and lighter with advances in solid state electronic control units, rechargeable batteries and hardware. A problem exists in providing a simple, miniaturized electrical connection system that is secure to provide the recharging current for the batteries within the appliance or to make other electrical connections.

Simple magnetic aided, electrical connectors for an electrical cable are known wherein a permanent magnet is employed in one coupling half to attract a plate of ferrous, permeable material in the other half to maintain contact between mating electrical connector elements in each coupling half as shown in U.S. Pat. No. 3,786,391. The magnetic attraction and force of attachment depends on the size and strength of the permanent magnet, and it is difficult to achieve high attachment force in a small space.

SUMMARY OF THE INVENTION

It is thus an object of the present invention to effect a secure temporary electrical connection between mutual electrical contacts of a light weight, miniaturized portable appliance and a base unit for providing electrical signals therebetween.

It is a further object of the present invention to effect a secure temporary electrical connection of a connector with one or more surface or flush mount electrical connector pad on the surface of a light weight, miniaturized, portable appliance.

It is a still further object of the present invention to provide an electrical connector system or making an electrical connection between electrical contacts of first and second connectors that is readily effected by a simple push operation for effecting both connection and disconnection, particularly between, but not limited to such a light weight, miniaturized, portable appliance and a base unit or exchanging electrical signals therebetween.

These and other objects of the present invention are realized in a magnetically retained, electrical connection system for making secure, temporary electrical contact between a first coupling surface of a portable appliance or first electrical unit and a second coupling surface of a second electrical or base unit for passing electrical signals therebetween when said first and second units are brought into contact, the connection system comprising first electrical contact means electrically coupled to the first unit and formed in the first coupling surface, second electrical contact means electrically coupled to the second unit and formed in the second coupling surface, and magnetic latching means for coupling the first and second coupling surfaces together and making secure electrical contact between the first and second electrical contact means when the first unit is positioned with respect to the second unit and subjected to a first push movement of the coupling surfaces toward one another and/or decoupling the first and second coupling surfaces when the first unit, positioned with respect to the second unit, is subjected to a second push movement of the coupling surfaces toward one another.

More specifically, the first electrical contact means further comprises at least one conductive surface area of the first coupling surface, and the second electrical contact means further comprises a corresponding push actuated pin biased to extend from the second coupling surface. The push actuated pin is operable to make secure electrical contact as the conductive surface area is brought to bear against it in response to the first push movement.

In particular, a magnetically attractive surface area is formed in the first coupling surface in a predetermined position with respect to the first electrical contact means, and push latching means is provided for securing an electrical circuit between the first and second electrical contact means and for establishing a magnetic circuit with the magnetically attractive surface area when the appliance is positioned with respect to the base unit with the first and second coupling surfaces in mating relationship and subjected to a first push movement of the first and second coupling surfaces toward one another and for breaking the magnetic circuit when the appliance is subjected to a subsequent, second push movement of the first and second coupling surfaces toward one another.

The push operable latching means further preferably comprises a magnetic field producing means in a fixed position in the base unit, a magnetically attractive surface member formed in the first coupling surface in a predetermined position with respect to the first electrical contact means, and a push actuated latch means formed in the base unit in relation to the second coupling surface and the second electrical contact means.

The push actuated latch means has magnetic coupling members movable between a first and a second latch position with respect to the second coupling surface to contact and attract and form a magnetic circuit with the magnetically attractive surface area and the magnetic field when the first and second coupling surfaces are brought into contact and the coupling members are moved to the second latch position adjacent to the magnetic field.

Preferably, the latch has means responsive to a first push movement applied by the user pressing the first coupling surface against the second coupling surface against the force of a biassing means for establishing and latching the magnetic circuit and means responsive to a second push movement in the same direction for releasing the magnetic circuit therebetween, whereby electrical contact between the first and second electrical contacts is made and secured in the second latch position and released in the first latch position.

In practice, the magnetic circuit comprises a magnetically attractive member in the appliance and the elements in the base unit comprising a fixed magnet, a pair of spaced apart magnetic coupling members which are movable between the spaced latch position, where the members are spaced from the fixed magnet, to the adjacent latch position, where each respective member is positioned close to a pole of the magnet, whereby the magnetic circuit is established in response to the first push movement of the magnetically attractive member formed in the first coupling surface against and into contact with the magnetic coupling members. The magnetic circuit is broken on application of a second push movement of the magnetically attractive member formed in the first coupling surface against and into contact with the magnetic coupling members.

Furthermore, latch means are operable in response to the first push movement effecting movement of the magnetic coupling members into the adjacent latch position against the force of the biasing means and comprise an escapement pin and groove mechanism. The escapement pin rides in an escapement groove during movement between the first and second latch positions and provides a latching force that overcomes the force of the biasing means in the second latch position. The groove preferably includes a first V-shaped engaging point that the escapement pin engages in the first latch position and a second V-shaped engaging point that the escapement pin engages in the second latch position.

In the preferred embodiment, the first unit is a portable, rechargeable battery powered appliance, e.g. a photographic still camera, and the second unit is a base power unit for providing recharging current to the rechargeable battery of the appliance when the coupling surface of the appliance is brought into contact with that of the power unit.

Through the use of the connector system of the present invention, light weight and miniature portable appliances may be securely connected to a base unit without any additional force applied by the user to maintain the connection or the use of any complex or bulky attachment mechanism. The connector system does not add any structure internal to the portable appliance that takes up space or adds weight, since it merely requires a surface mounted, relatively small, plate of magnetically attractive material and one or more surface mounted electrical contact areas for making contact with the magnetic coupling bars and the terminal pin(s) of the base unit, respectively. The connector system components of the portable appliance and the base unit may be positioned so that a cradle is formed in the base unit that only accepts the portable appliance in a single orientation. The simple push movements for attachment and release are simple to comprehend and employ, and the correct attachment can be readily seen by the user. The latch mechanism allows use of a magnetic attachment mechanism that does not employ bulky and heavy magnets to achieve the same connecting force and allows attachment and release with the application of light force push movements.

BRIEF DESCRIPTION OF THE DRAWINGS

Other objects, advantages and features of the present invention will become apparent from the following specification when taken in conjunction with the accompanying drawings in which like elements are commonly enumerated and in which:

FIG. 1 is a schematic plan view of the components of the magnetically secured connector of the present invention situated in the portable appliance and base unit in the disconnect position;

FIG. 2 is a schematic plan view of the components of the magnetically secured connector of the present invention situated in the portable appliance and base unit in the magnetically secured position following application of a first push movement of the portable appliance onto the connector components of the base unit;

The drawings are not necessarily to scale.

DETAILED DESCRIPTION OF THE PREFERRED EMBODIMENT

The invention is disclosed as being embodied preferably in conjunction with a miniaturized photographic camera having a rechargeable battery therein for powering various known functions of a camera as the disclosed portable appliance and with a battery recharger as the base unit. However, it will be understood that the connector system disclosed may be used with any of the portable appliances and base units described above and for functions other than recharging batteries in the portable appliance.

Figure 8:
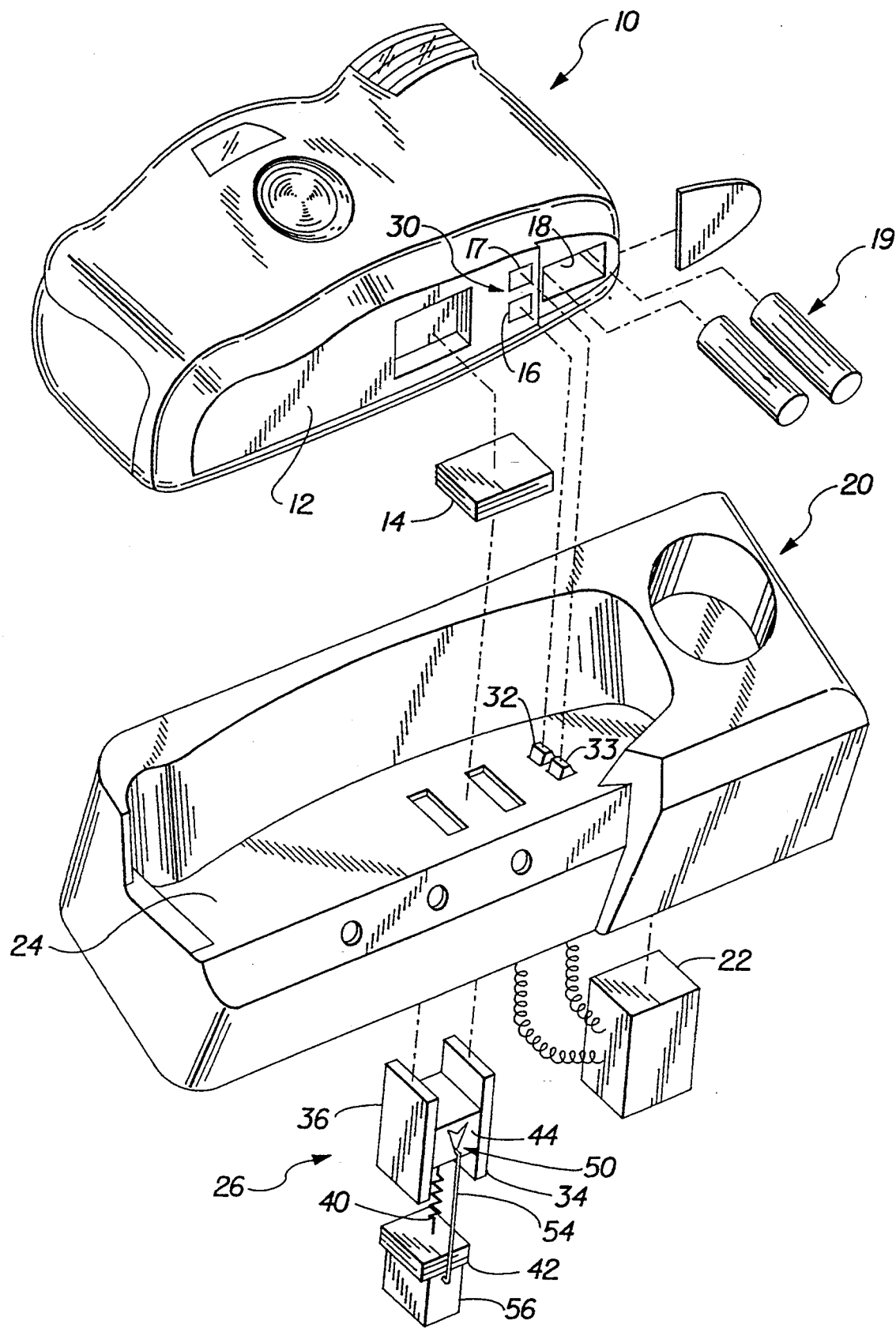
FIG. 8 is a perspective view of a rechargeable camera and base charging unit depicting the relative orientation of the system of the invention in one preferred embodiment thereof.

In this respect, FIGS. 1 and 2 depict in a general, schematic way the operative components of the connector system of the invention in the portable appliance or camera and the base unit or battery recharger. FIG. 8 depicts the elements of the preferred embodiment of the invention in a perspective view to better show the first and second coupling surfaces. The camera body 10 may take the form of the STAR 73SR rechargeable battery powered camera sold by Eastman Kodak Co. or any camera which is generally box shaped having a lens, viewfinder, auto-focus and auto-exposure control, flash illumination and like parts or components on one major side, a film cartridge door and receptacle on the opposite major side, a film advance and exposure button on the top and a base that is typically free of controls or components except for an access door to a battery compartment for the replacement of the battery or batteries 19. The battery typically powers an electronic control unit for the various automated focus, exposure, film advance, flash illumination, etc. systems and components. The automation of camera functions, and the frequency of use, place great demands on battery current. At the same time, it is desirable to miniaturize and decrease camera weight. These considerations dictate the use of rechargeable batteries, and supplying the purchaser of the camera with a recharger for the batteries.

Thus, in FIGS. 1 and 2 a recharger base unit 20 is schematically depicted in relation to the camera 10 and in order to depict the internal and external components of the magnetic and electrical circuit connector system of the invention. Camera 10 is only shown schematically from a side view to show that on one surface 12 thereof (e.g. the camera base), the camera bearing components of the connector system 30 of the invention are positioned. These components are also depicted in FIG. 8. FIGS. 1 and 2 differ from FIG. 8 in depicting alternate electrical circuit components.

In FIGS. 1, 2 and 8 the rectangular plate 14 of magnetically attractive, permeable, conductive material, e.g. a soft ferrous metal, is depicted surface mounted in or on the base 12 of camera 10. In FIGS. 1 and 2, magnetically attractive plate 14 forms one electrical circuit contact for the charging circuit for recharging the batteries in battery receptacle 18. The other depicted electrical circuit contact is the smaller, surface mounted electrical contact 16 which is positioned in a predetermined position with respect to the plate 14. The plate 14 and the contact surface 16 are wired internally to a rechargeable battery receptacle 18 (or positioned so as to provide battery terminal contact surfaces for such a battery receptacle) into which a rechargeable battery is inserted so that its terminals bear against such contacts to make electrical connection with the electronic control system of the camera in a manner well known in the art.

In FIG. 8, separate first and second camera mounted contact surfaces 16 and 17 are depicted side by side. The contact surfaces 16,17 are coupled internally to the positive and negative terminal contacts in receptacle 18 that batteries 19 make contact with. Thus the magnetically attractive plate 14 is alternatively depicted as not forming pan of the electrical circuit.

Returning to FIGS. 1 and 2, the base unit 20 is also shown schematically and generally box shaped and includes an AC/DC converter and voltage regulator 22 formed as a module and operable in a conventional fashion to provide battery voltage DC recharge current from line power. The DC charging current is applied through conductors to the connector pin 32 which is spring biased by spring 35 to extend out of base unit coupling surface 24 and to a coupling bar or member 34 which is also spring biased to extend outward from the base unit coupling surface 24. As shown in FIG. 2, when the camera 10 is positioned with its coupling surface 12 on the base unit coupling surface 24, the contact pin 32 and coupling bar 34 make mechanical and electrical contact with the plate 14 and contact surface area 16, respectively. The electrical circuit is thus completed and stabilized by operation of the push latch mechanism 26 to retain the camera 10 in secure temporary attachment thereto when the base coupling surface 12 thereof is fined on or into the base unit coupling surface 24 in a manner to be described. In this regard, the surface 24 may be configured to form a recess or cradle as depicted in FIG. 8 that receives the camera base coupling surface 12 so that the components of the electrical circuit are aligned properly when the camera 10 is pushed into the cradle.

Thus in the embodiment of FIGS. 1 and 2, the recharge current is coupled at the +and − outputs of the AC/DC converter/regulator 22 to a terminal or electrical contact pin 32 and a coupling bar or member 34 of the push latch mechanism 26 so that electrical connection may be made through the plate 14 and contact area 16 to the battery receptacle 18 and to the terminals of a battery positioned therein as described above. A further coupling bar 36 of the push latch mechanism 26 may also be electrically connected to the − terminal of converter/regulator 22 to make a redundant connection.

In the embodiment of FIG. 8, the + and − terminals of the AC/DC converter/regulator 22 are connected to the first and second electrical contact pins 32 and 33 which project upward from second coupling surface 24 and are spring biased by respective springs. When the camera 10 is positioned, pins 32 and 33 bear against the contact surfaces 16 and 17, respectively, to make electrical contact. A first push movement of the camera 10 surface 12 against base unit coupling surface 24 operates push latch mechanism to effect closure and latching of the magnetic circuit to maintain electrical contact in a manner to be described.

As shown in FIG. 1, the camera 10 and base unit 20 are separated apart such that each of the coupling bars 34, 36 of the push latch mechanism 26 projects from the surface 24 a predetermined distance. The coupling bars 34 and 36 are preferably formed of flat, rectangular, relatively thin plates of a magnetically permeable, electrically conductive material, e.g. a soft ferrous metal. The coupling bars 34 and 36 are spaced apart and have a width that corresponds generally to the dimensions of the plate 14. When the camera base coupling surface 12 is fitted on the cradle formed in the base unit coupling surface 24, a magnetic circuit is completed between the plate 14 and the coupling bars 34 and 36 as described below. At the same time, the pin(s) 32, 33 makes contact with the contact area(s) 16, 17 as described above.

The push latch mechanism 26 includes the above described coupling bars 34 and 36 in cooperation with the other components depicted in FIGS. 1, 2 and 8 including the biasing spring 40, permanent magnet 42 and latching escapement mechanism 50, described more specifically below in reference to FIGS. 3-7. The depiction of these components is quite schematic and intended to generally describe a magnetically actuated latch mechanism 26 of the type typically using a magnetic circuit and escapement mechanism to latch and unlatch a door, e.g. a glass door of a stereo component cabinet, in response to first and second pushes of the door against a fixed latch housing or door frame to engage and release. Such magnetic latch mechanisms 26, or latches, are shown, for example, in U.S. Pat. Nos. 3,492,037, 4,227,726, 4,270,781, 4,331,355, and 4,702,506 all incorporated herein by reference in their entireties. Of course, such door latches do not make and break electrical circuits in accordance with the invention, and any one or any similar push-to-connect/push-to-disconnect latch may be employed as the latch mechanism 26 for the connector system 30 of the invention.

Referring again to FIGS. 1 and 2, in the latch mechanism 26, the coupling bars 34, 36 are typically held in the spaced-apart relationship described above by an intermediate, non-metallic frame or supporting member 44 which bears on one side against an upward stop 46. The other end of the frame member 44 bears against the coil spring 40 which is supported by permanent magnet 42 which in turn is supported by member 56 attached to base unit 20. The assembly of the spring 40, the coupling bars 34 and 36 and frame member 44 is fitted into a receptacle (not shown) in the body of the base unit 20 that allows reciprocal movement of the assembly against the bias force of the spring 40. The magnet 42 is fixed in position just past the ends of the parallel coupling bars 34 and 36 in a spaced apart relationship when the other ends are biased outward through openings in the surface 24 as shown in FIG. 1.

When force is applied to the outwardly extending ends of the coupling bars 34, 36 sufficient to overcome the bias of spring 40, the other ends of the coupling bars 34, 36 are brought alongside or adjacent to the poles of the magnet 42. If that push force is applied through the permeable plate 14 brought to bear against the other ends of the bars 34, 36 as shown in FIG. 2, then a magnetic circuit is completed that tends to attract the permeable plate 14 and maintain the compression of the biasing spring 40. Such a latch mechanism as described to this point corresponds generally to that shown in the above-incorporated '037 patent.

The magnetic attraction afforded through the magnetic circuit is not sufficient alone to maintain the connection unless the biasing force of the spring 40 is overcome. To maintain the secure attachment and response to the first and second push movements to establish and break the magnetic circuit, the latch and escapement mechanism 50 is formed between a double V-shaped escapement track or groove 52 formed in member 44, for example, and an escapement pin 54 which is pivotally fixed through a 90° turn at one end to the magnet supporting member 56 and has its other free end formed at a 90° angle to fit in the guide groove 52.

The guide groove 52 has upper and a lower V-shaped engaging points 58 and 60, respectively, in which the free end of escapement pin 54 rests in the unlatched position depicted in FIG. 1, where the coupling members 34 and 36 are spaced from the poles of magnet 42, and the latched position of FIG. 2, where the coupling members 34 and 36 are adjacent to the poles of magnet 42. The free end of the escapement pin 54 traverses branches 62 and 64 of guide groove 52 to reach the upper engaging point 58 during a first push movement of the camera first coupling surface 12 onto the projecting ends of coupling members 34, 36 and contact pins 32, 33 from the unlatched position of FIG. 1. Similarly, the free end of the escapement pin 54 traverses branches 66 and 68 of guide groove 52 to return to the lower engaging point 60 during a second push movement from the latched position of FIG. 2.

Figure 3:
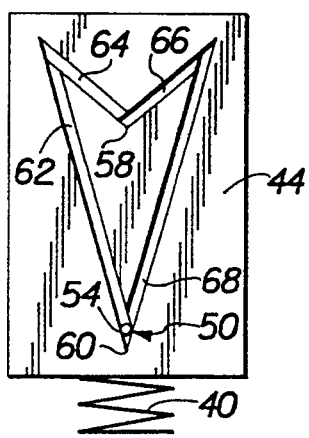
FIG. 3 is a side schematic view of a typical pin escapement mechanism of the internal structure of the base unit connector mechanism in the position depicted in FIG. 1.
Figure 4:
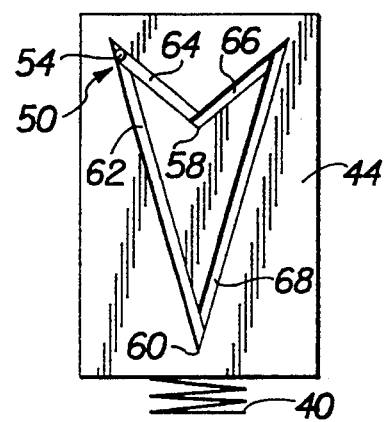
FIG. 4 is a side schematic view of the pin escapement mechanism responding to a first push movement by the user of the portable appliance onto the coupling bars and contact pin in the cradle of the base unit as depicted in FIG. 2, whereby the internal spring is compressed.

These paths of travel are depicted schematically in FIGS. 3-7. FIG. 3 is a schematic view of the pin escapement mechanism where the free end of the pin 54 is lodged in the lower engaging point 60 in the unlatched position of FIG. 1. FIG. 4 is a schematic view of the pin escapement mechanism responding to a first push movement by the user of the camera against the coupling bars 34, 36 and contact pin 32 in the cradle of the base unit 20. In FIG. 4, the push pressure is not yet released, the internal spring 40 is compressed and the free end of the escapement pin 54 is moved along groove 62 to its uppermost end. At this point, the upper ends of the coupling bars 34, 36 are fully or partially retracted into the openings in the surface 24.

Figure 5:
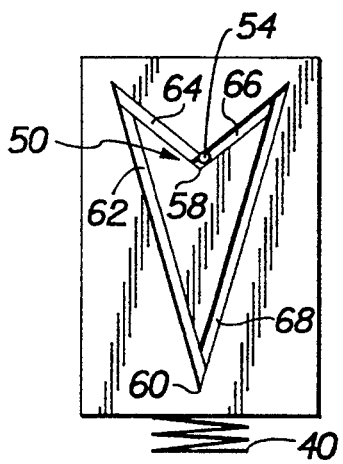
FIG. 5 is a side schematic view of the pin escapement mechanism holding the spring compressed upon release of the first push movement by the user securing the portable appliance onto the coupling bars and contact pin in the cradle of the base unit as depicted in FIG. 2, whereby the mechanical and electrical connection is maintained by the magnetic circuit made through the coupling bars and magnetically attractive plate.

In FIG. 5, the pin escapement mechanism holds the spring 40 compressed as the free end of the escapement pin 54 moves down groove 64 into upper engaging point 58 upon release of the first push movement by the user. In this position, corresponding to FIG. 2, the magnetic circuit made through the coupling bars 34, 36 and magnetically attractive plate 14 secures the camera 10 onto the base unit 20 cradle. The mechanical and electrical connections described above are maintained by the magnetic circuit and the escapement mechanism 50.

Figure 6:
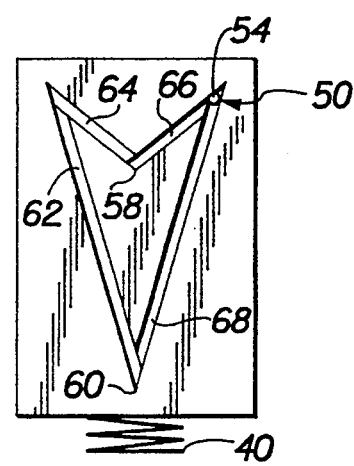
FIG. 6 is a side schematic view of the pin escapement mechanism responding to a second push movement by the user of the portable appliance against the coupling bars and contact pin in the cradle of the base unit, whereby the internal spring is compressed and the pin of the escapement mechanism is released from the latched position of FIG. 5.
Figure 7:
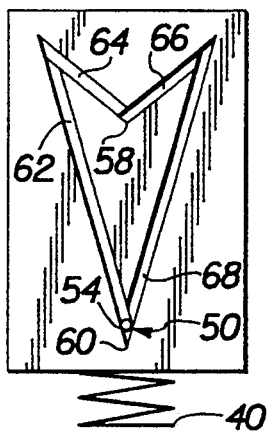
FIG. 7 is a side schematic view of the pin escapement mechanism with the spring expanded upon traverse of the escapement pin back to the start position during the second push movement by the user, whereby the magnetic circuit is broken and the portable appliance is released from connection with the base unit.

FIG. 6 is a side schematic view of the pin escapement mechanism responding to a second push movement by the user transmitted through the camera 10 which depresses the coupling bars 34, 36 and contact pin(s) 32, 33 in the cradle of the base unit 20. When this occurs, the free end of the escapement pin 54 traverses groove 66 to the upper end of groove 68. Thereafter, upon release of the second push pressure, the free end of the escapement pin 54 traverses the groove 68 downward and comes to rest at the lower engaging point 60. This rest position is depicted in FIG. 7. As the downward movement occurs, the coupling bars 34, 36 move upward as the spring force of biasing spring 40 is released, and the magnetic circuit is broken. The electrical circuit may also break as the electrical contact pressures decrease. The weight of the camera 10 is insufficient to effect the latching of the push latch mechanism 26 and latching escapement mechanism 50 as described above, and makes electrical contact unreliable.

Although not illustrated, it will be understood that the latching mechanism 26 may also operate an electrical switch in the base unit 20 to make and break the electrical connection of the AC/DC converter and voltage regulator 22 with the pin(s) 32, 33 or with the line power as the magnetic circuit is established and broken so that power is automatically interrupted when charging is not taking place. Moreover, it will be understood that the permanent magnet 42 may be replaced by an electromagnet which, when energized either manually or on automatic closure of such a switch, produces a magnetic field providing the North and South poles for forming the magnetic circuit described above.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST camera 10
camera base or coupling surface 12
magnetically attractive, permeable, conductive surface 14
electrical contact surface 16
second electrical contact surface 17
battery receptacle 18
base unit 20
AC/DC converter and voltage regulator 22
base unit cradle or coupling surface 24
push latch mechanism 26
biasing spring 35
electrical contact pin 32
second electrical contact pin 33
coupling bars 34 and 36
biasing spring 40
permanent magnet 42
intermediate, non-metallic game member 44
upward stop 46
latching escapement mechanism 50
double V-shaped guide groove 52
escapement pin 54
magnet supporting member 56
upper and a lower V-shaped engaging points 58 and 60
escapement groove branches 62 and 64
escapement groove branches 66 and 68
connector system 30

What is claimed is:

1. A magnetically retained, electrical connection system for making secure, temporary electrical contact between a first coupling surface of a portable appliance and a second coupling surface of a base unit for providing electrical communication with said appliance when brought into contact with said base unit, said connection system comprising:

first electrical contact means electrically coupled to an electrical component of said portable appliance and positioned with respect to said first coupling surface for conducting electrical signals to or from said base unit;

second electrical contact means electrically coupled to an electrical component of said base unit and positioned with respect to said second coupling surface for conducting said electrical signals to or from said appliance when said first electrical contact means of said portable appliance is brought into electrical contact with said second electrical contact means of said base unit on positioning of said first coupling surface in mating relation against said second coupling surface;

a magnetically attractive member positioned with respect to said first coupling surface in a predetermined position with respect to said first electrical contact means;

means for providing a magnetic field within said base unit; and push operable means for establishing a magnetic circuit between said magnetically attractive member and said magnetic field when said appliance is positioned with respect to said base unit with said first and second coupling surfaces in mating relationship and is subjected to a first push movement of said first coupling surface against said second coupling surface, whereby said magnetic circuit exerts magnetic attractive force between said base unit and said portable appliance to stabilize the electrical connection between said first and second electrical contact means, and for breaking said magnetic circuit when said appliance is subjected to a subsequent, second push movement of said first coupling surface toward said second coupling surface.

2. The system of claim 1 wherein said push operable means further comprises:

push actuated magnetic circuit means positioned in said base unit for movement in relation to said magnetic field providing means having first and second magnetic coupling members movable together between a spaced position spaced from said magnetic field providing means and an adjacent position adjacent said magnetic field providing means for establishing said magnetic circuit therewith through contact and attraction with said magnetically attractive member when said first and second coupling surfaces are brought into contact and subjected to said first push movement and movable together back to said spaced position with respect to said magnetic field providing means upon said second push movement of said first coupling surface against said second coupling surface to break said magnetic circuit; and mechanical latch and escapement means for defining said spaced and adjacent positions and responsive to said first and second push movements for latching said first and second movable coupling members in said adjacent and spaced positions, respectively.

3. The system of claim 2 further comprising:

coupling member biasing means for biasing said first and second magnetic coupling members to extend away from said magnetic field providing means and outward of said second coupling surface with a biasing force which exceeds the magnetic force of said magnetic circuit; and wherein said mechanical latch and escapement means latches said first and second magnetic coupling members into said spaced position to limit said outward extension of said first and second coupling members from said second coupling surface and latches said first and second magnetic coupling members into said adjacent position to overcome said biasing force and maintain said magnetic circuit.

4. The system of claim 3 wherein said mechanical latch and escapement means further comprises:

escapement track means coupled to said first and second magnetic coupling members for movement therewith and for providing an escapement track between first and second latched positions corresponding to said spaced and adjacent positions of said first and second coupling members with said magnetic field providing means, respectively; and latching means coupled to said base unit for engaging said escapement track and for engaging in said first and second latched positions upon movement of said magnetic coupling members into said spaced and adjacent positions with said magnetic field providing means, whereby said latching means mechanically latches said magnetic circuit with said magnetically attractive member of said appliance in response to said first push movement of said latching means into said first latched position and un-latches said magnetic circuit in response to said second push movement of said latching means from said first latched position to said second latched position.

5. The system of claim 4 wherein said escapement track means further comprises:

a member supporting said first and second magnetic coupling members in spaced apart relationship and movable therewith away from said magnetic field providing means under the biasing force of said coupling member biasing means and toward said magnetic field providing means under the force applied in the first and second push movements; and an escapement groove formed in said supporting member to have an extended, V-shaped engaging point forming said first latched position when engaged and a retracted, V-shaped engaging point forming said second latched position when engaged;

and wherein said latching means further comprises:

an escapement pin having a fixed end attached to said base unit and a free end positioned to traverse said escapement groove and engage into said retracted engaging point in response to said first push movement and to traverse said escapement groove and engage into said extended engaging point in response to said second push movement, whereby said escapement pin free end engages in said retracted and extended engaging points to position said first and second coupling members in said adjacent and spaced positions, respectively, in opposition to said biasing force.

6. The system of claim 5 wherein:

the biasing force of said coupling member biasing means is sufficient to maintain said free end of said engagement means in said extended and retracted V-shaped engaging points but is overcome by manual force applied in said first and second push movements to release said escapement pin from the engaging point that it is in and to traverse said escapement groove to be engaged in the other engaging point on termination of the push movement.

7. The system of claim 6 wherein:

said free end of said engagement pin is moved in said escapement groove through the force applied in said first and second push movements against said magnetic coupling members effecting movement of said groove in said supporting member from said extended V-shaped engaging point and into said V-shaped retracted engaging point in response to said first push movement and from said retracted V-shaped engaging point and into said extended V-shaped engaging point in response to said second push movement.

8. The system of claim 2 wherein said mechanical latch and escapement means further comprises:

means for providing a first mechanical latch in a first latch position with said first and second magnetic coupling members in said adjacent position to maintain said first magnetic circuit against force tending to separate said first and second coupling surfaces, and thereby diminish said magnetic attractive force necessary to be provided by said magnetic field providing means to maintain said magnetic circuit when it is established; and means for providing a second mechanical latch in a second latch position with said first and second magnetic coupling members in said spaced position.

9. The system of claim 8 wherein said first and second mechanical latches further comprise:

escapement track means coupled to said first and second magnetic coupling members for movement therewith and for providing said first and second latch positions and an escapement track therebetween; and latching means having a fixed end attached to said base unit and a free end positioned to traverse said escapement track and engage in said first latch position in response to said first push movement and to traverse said escapement track and engage into said latch position in response to said second push movement, whereby said free end engages in said first and second latch positions to maintain said first and second coupling members in said adjacent and spaced positions, respectively.

10. The system of claim 9 further comprising:

coupling member biasing means for biasing said first and second magnetic coupling members to extend away from said magnetic field providing means and outward of said second coupling surface with a biasing force which exceeds the magnetic force of said magnetic circuit; and wherein said latching means latches said first and second magnetic coupling members into said spaced position to limit said outward extension of said first and second coupling members from said second coupling surface and latches said first and second magnetic coupling members into said adjacent position to overcome said biasing force and establish said magnetic circuit.

11. The system of claim 1 wherein:

said first electrical contact means further comprises at least one conductive surface area of said first coupling surface; and said second electrical contact means further comprises at least one contact pin, each such contact pin biased to extend outward of said second coupling surface and to retract inward in response to contact with a respective conductive surface area of said first coupling surface and in response to said first and second push movements.

12. The system of claim 2 wherein:

said first electrical contact means further comprises at least one conductive surface area of said first coupling surface and said magnetically attractive member; and said second electrical contact means further comprises at least one contact pin biased to extend outward of said second coupling surface and to retract inward in response to contact with a said conductive surface area of said first coupling surface and in response to said first and second push movements and at least one of said movable coupling members, whereby electrical communication is established and maintained between said first and second electrical contact means upon latching of said coupling members in said adjacent position with respect to said magnetic field producing means.

13. The system of claim 1 wherein said push operable means further comprises:
    push actuated magnetic circuit means positioned in said base unit for movement in relation to said magnetic field providing means having magnetic coupling means movable between a spaced position spaced from said magnetic field providing means and an adjacent position adjacent said magnetic field providing means for establishing said magnetic circuit therewith through contact and attraction with said magnetically attractive member when said first and second coupling surfaces are brought into contact and subjected to said first push movement and movable back to said spaced position with respect to said magnetic field providing means upon said second push movement of said first coupling surface against said second coupling surface to break said magnetic circuit; and
    mechanical latch and escapement means for defining said spaced and adjacent positions and responsive to said first and second push movements latching said movable coupling means in said adjacent and spaced positions, respectively.

14. The system of claim 13 further comprising:
    coupling member biasing means for biasing said movable coupling means to extend away from said magnetic field providing means and outward of said second coupling surface with a biasing force which exceeds the magnetic force of said magnetic circuit; and
    wherein said mechanical latch and escapement means latches said movable magnetic coupling means into said spaced position to limit said outward extension of said first and second coupling members from said second coupling surface and latches said movable magnetic coupling means into said adjacent position to overcome said biasing force and maintain said magnetic circuit.

15. The system of claim 14 wherein said mechanical latch and escapement means further comprises:
    escapement track means coupled to said movable magnetic coupling means for movement therewith and for providing an escapement track between first and second latched positions corresponding to said spaced and adjacent positions of said first and second coupling members with said magnetic held providing means, respectively; and
    latching means coupled to said base unit for engaging said escapement track and for engaging in said first and second latched positions upon movement of said magnetic coupling members into said spaced and adjacent positions with said magnetic field providing means, whereby said latching means mechanically latches said magnetic circuit with said magnetically attractive member of said appliance in response to said first push movement of said latching means into said first latched position and un-latches said magnetic circuit in response to said second push movement of said latching means from said first latched position to said second latched position.

16. The system of claim 15 wherein said escapement track means further comprises:
    a member supporting said movable magnetic coupling means in spaced apart relationship and movable therewith away from said magnetic field providing means under the biasing force of said coupling member biasing means and toward said magnetic field providing means under the force applied in the first and second push movements; and
    an escapement groove formed in said supporting member to have an extended, V-shaped engaging point forming said first latched position when engaged and a retracted, V-shaped engaging point forming said second latched position when engaged;
    and wherein said latching means further comprises:
    an escapement pin having a fixed end attached to said base unit and a free end positioned to traverse said escapement groove and engage into said retracted engaging point in response to said first push movement and to traverse said escapement groove and engage into said extended engaging point in response to said second push movement, whereby said escapement pin free end engages in said retracted and extended engaging points to position said first and second coupling members in said adjacent and spaced positions, respectively, in opposition to said biasing force.

17. The system of claim 16 wherein:
    the biasing force of said coupling member biasing means is sufficient to maintain said free end of said engagement means in said extended and retracted V-shaped engaging points but is overcome by manual force applied in said first and second push movements to release said escapement pin from the engaging point that it is in and to traverse said escapement groove to be engaged in the other engaging point on termination of the push movement.

18. The system of claim 17 wherein:
    said free end of said engagement pin is moved in said escapement groove through the force applied in said first and second push movements against said magnetic coupling members effecting movement of said groove in said supporting member from said extended V-shaped engaging point and into said V-shaped retracted engaging point in response to said first push movement and from said retracted V-shaped engaging point and into said extended V-shaped engaging point in response to said second push movement.

19. The system of claim 13 wherein said mechanical latch and escapement means further comprises:
    means for providing a first mechanical latch in a first latch position with said movable magnetic coupling means in said adjacent position to maintain said first magnetic circuit against force tending to separate said first and second coupling surfaces, and thereby diminish said magnetic attractive force necessary to be provided by said magnetic field providing means to maintain said magnetic circuit when it is established; and
    means for providing a second mechanical latch in a second latch position with said movable magnetic coupling means in said spaced position.

20. The system of claim 19 wherein said first and second mechanical latches further comprise:
    escapement track means coupled to said movable magnetic coupling means for movement therewith and for providing said first and second latch positions and an escapement track therebetween; and
    latching means having a fixed end attached to said base unit and a free end positioned to traverse said escapement track and engage in said first latch position in response to said first push movement and to traverse said escapement track and engage into said latch position in response to said second push movement, whereby said free end engages in said first and second latch positions to maintain said first and second coupling members in said adjacent and spaced positions, respectively.

21. The system of claim 20 further comprising:

coupling member biasing means for biasing said movable magnetic coupling means to extend away from said magnetic field providing means and outward of said second coupling surface with a biasing force which exceeds the magnetic force of said magnetic circuit; and wherein said latching means latches said movable magnetic coupling means into said spaced position to limit said outward extension of said first and second coupling members from said second coupling surface and latches said movable magnetic coupling means into said adjacent position to overcome said biasing force and establish said magnetic circuit.

* * * * *

UNITED STATES PATENT AND TRADEMARK OFFICE
CERTIFICATE OF CORRECTION

PATENT NO. : 5,382,167
DATED : January 17, 1995
INVENTOR(S) : Wilbert F. Janson, Jr. et al It is certified that error appears in the above-indentified patent and that said Letters Patent is hereby corrected as shown below:

Column 13, line 23, after "movements" insert --for--.

Column 13, line 48, after "magnetic" delete "held" and insert --field--.

Signed and Sealed this

Twenty-third Day of May, 1995

Attest:

BRUCE LEHMAN

*Attesting Officer*     *Commissioner of Patents and Trademarks*